United States Patent [19]

Crabtree

[11] 4,108,425

[45] Aug. 22, 1978

[54] MOTOR WORK STAND

[76] Inventor: George Frederick Crabtree, P.O. Box 1135, Winter Garden, Fla. 32787

[21] Appl. No.: 865,349

[22] Filed: Dec. 28, 1977

[51] Int. Cl.² .............................................. B23Q 1/04

[52] U.S. Cl. ...................................................... 269/71

[58] Field of Search .................................... 269/71-73, 269/76, 17, 55, 58-59; 254/124, 8 B

[56] References Cited

U.S. PATENT DOCUMENTS

| | | | |
|---|---|---|---|
| 3,027,158 | 3/1962 | Barbee | 269/71 |
| 4,021,017 | 5/1977 | Adams | 254/124 |

*Primary Examiner*—Robert C. Watson

*Attorney, Agent, or Firm*—Sughrue, Rothwell, Mion, Zinn and Macpeak

[57] ABSTRACT

A repair stand for heavy objects such as outboard motors has a base with a vertical standard. The standard has a vertically adjustable carrier tube with a horizontal cross rod on its upper end. A mounting plate is secured to the rod on arms with bearings whereby it is pivotal about the rod. A hydraulic cylinder with an extensible and retractable ram is positioned on the carrier tube and is connected, through a channel track and trolley, to the plate to effect controlled pivotal movement thereof.

4 Claims, 6 Drawing Figures

MOTOR WORK STAND

BACKGROUND OF THE INVENTION

1. Field of the Invention

This invention relates to work stands of the type wherein heavy objects are positioned by the stand at selected locations most convenient for servicing or repair.

2. Statement of the Prior Art

Work holders of the general category herein proposed include those shown in prior U.S. Pat. Nos. 3,317,205 and 3,979,111 and work holders with hydraulic controls are also heretofore known. The latter are representatively shown in the below listed prior U.S. Patents:

| Patent No. | Inventor | Date of Issuance |
|---|---|---|
| 2,182,743 | Clergy, L. | December 5, 1939 |
| 2,445,016 | Bentley, H. P. | July 13, 1948 |
| 2,913,241 | Miner, R. F. | November 17, 1959 |
| 3,085,798 | Gavette, L.D. | April 16, 1963 |
| 3,750,254 | Krujcik | Aug. 7, 1973 |
| 3,814,413 | Bopp | June 4, 1974 |

SUMMARY OF THE INVENTION

The present invention provides a work stand for outboard marine engines and similar items which maximizes access to the engine during service and repair operations. The unit permits full 360° rotation of the work unit, and further provides for tilt of the unit in the range of 0° through 90°. By reason of a new and novel hydraulic control arrangement, the tilting of the work holder is simplified, and the stability of the unit following tilting is maintained.

The invention also provides a track and trolley system, which aids in the tilt operation and insures smooth operation of the overall assembly.

A safety lock feature is incorporated in the trolley.

Other and further advantages of the invention will become apparent to those skilled in the art from a consideration of the following specification when read in conjunction with the annexed drawing.

DESCRIPTION OF THE PREFERRED EMBODIMENT

Figure 1:
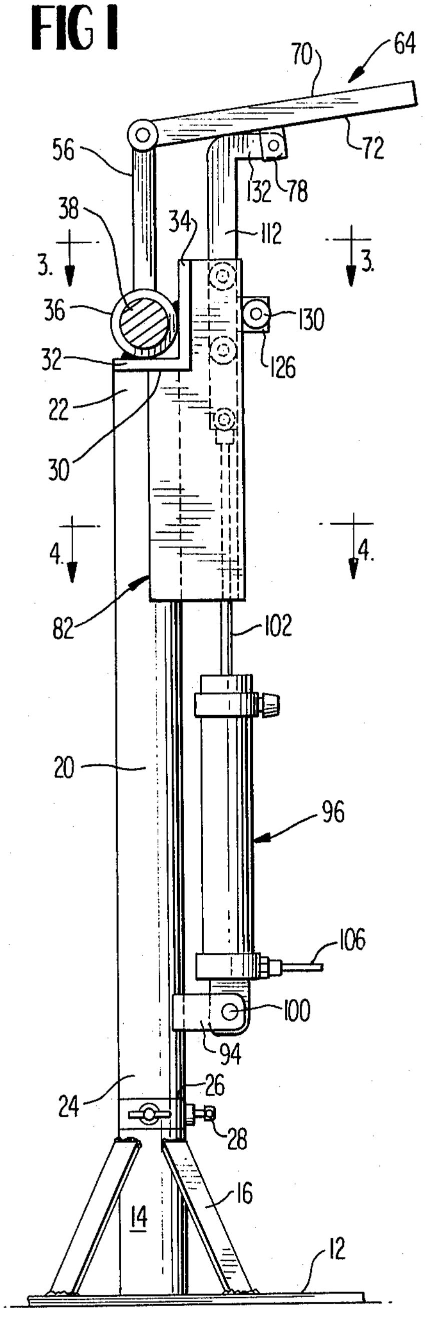
FIG. 1 is a side elevational view, partially in cross section, of the work stand hereof, with the mounting plate pivoted to full horizontal position.

Referring to the drawing in more detail, a repair stand assembly according to this invention is generally identified by reference numeral 10 therein. The repair stand 10 comprises a base 12 having a tubular sleeve element 14 projecting upwardly therefrom. The sleeve element 14 is reinforced by a plurality of struts 16 fixed to the base and to the sleeve as by welding.

Projecting upwardly from the sleeve element 14, and fixedly secured therein, is an elongated cylindrical standard 18. A tubular carrier tube 20 is slidably and rotatably mounted on the standard 18, and has an upper end 22 and a lower end 24. On the end 24 is a clamp band 26 which has a series of changeable fasteners 28 employed to releasably lock the carrier tube in selected relation to the standard 18.

An L-form bracket 30 is fixedly secured to the upper end 22 of the carrier tube. The bracket includes a horizontal foot 32, and a vertical leg 34. A sleeve 36 is secured by welds to the foot and leg, and an elongated horizontal rod 38 is fixedly mounted therein. The rod 38 has a first side portion 40 and a second side portion 42.

An outer bearing assembly 44 is secured on the second side portion 42 of the rod, and includes a stationary portion 46 and a sleeve 48 adapted for limited pivotal movement. A similar bearing assembly 50 is mounted on the first side portion 40 of the rod, and includes a stationary portion 52, and a pivotal sleeve 54.

Radial arms 56 and 58, respectively, extend from the sleeves 48 and 54 of the bearing assemblies. These terminate at their outer extremities in bearings 60 and 62. A motor mounting plate 64 has stub axles 66, 68 which extend into the bearings 60 and 62. The plate has opposite faces 70 and 72, and a U-form connection 74 includes a bight portion 76 and tabs 78 and 80 and is secured to the face 72 by means extending through the bight portion.

Figure 4:
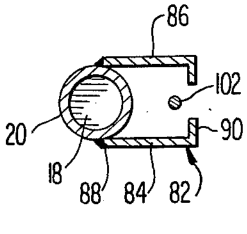
FIG. 4 is another sectional view on line 4—4 of FIG. 1, looking in the direction of the arrows.
Figure 5:
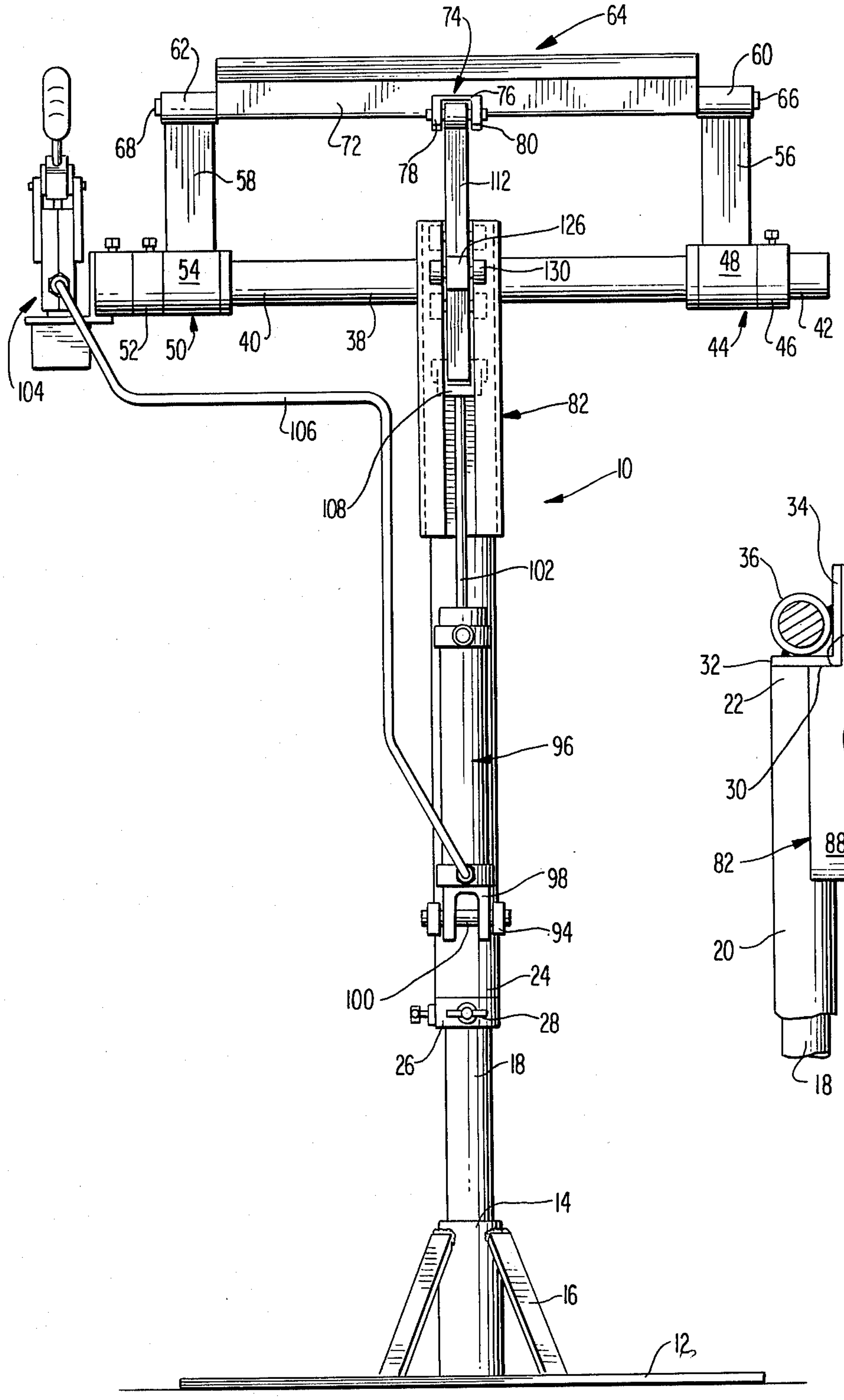
FIG. 5 is a front elevational view.
Figure 6:
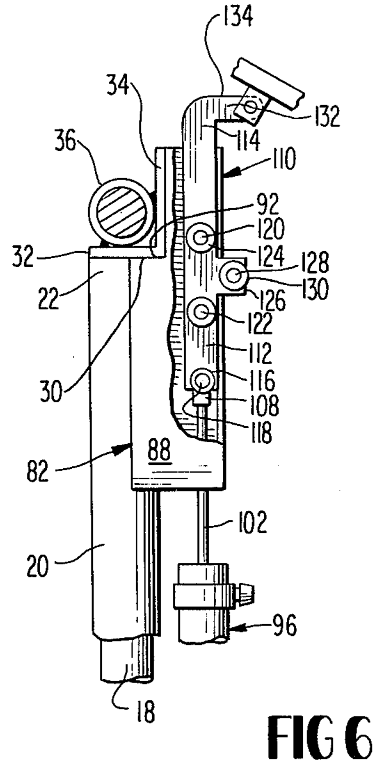
FIG. 6 is a side view, partially broken away, of the track and trolley means hereof.

A channel track assembly 82 is provided on the carrier tube 20. The assembly 82 comprises a pair of bars 84, 86 each having an elongated leg member 88 fixedly secured to the carrier tube 20, and a perpendicular foot member 90. The foot members are located in spaced apart, confronting positions, as shown in FIG. 4. The leg members are stepped at 92 so that the track assembly extends to the top of the leg 34 of the bracket on the upper end of the carrier tube.

A heavy clevis 94 is provided on the tube 20 on its lower end 24 below the track assembly. A hydraulic cylinder 96 has an end fitting 98 secured by a cross pin 100 in the clevis. An extensible and retractable ram 102 projects from the upper end of the cylinder.

Mounted on the outer extremity of the first side portion of the rod 38 is a hydraulic pump 104. The pump is of any selected design, and may be manual as shown, or otherwise powered. A fluid transmission line 106 extends from the pump to the cylinder 96.

The ram 102 has a U bracket 108 at its upper end. The trolley assembly 110 hereof comprises an elongated body 112 with upper and lower ends 114, 116. The lower end is connected by a cross pin 118 to the bracket 108 of the ram. At least a pair of axles 120 and 122 extend through the body member and have rollers 124 on their ends. A medial block 126 extends from the body member, and has a cross axle 128 with side rollers 130. The rollers 124 are so located as to contact the inner faces of the foot members 90, the block extending between the foot members, and the rollers 130 thereof being in rolling contact with the outer faces of the foot members.

At the upper end 114 of the body member is a substantially perpendicular offset 132 having a top surface 134. As shown in FIG. 1, when the mounting plate is fully elevated, the offset serves as a safety lock means.

Figure 2:
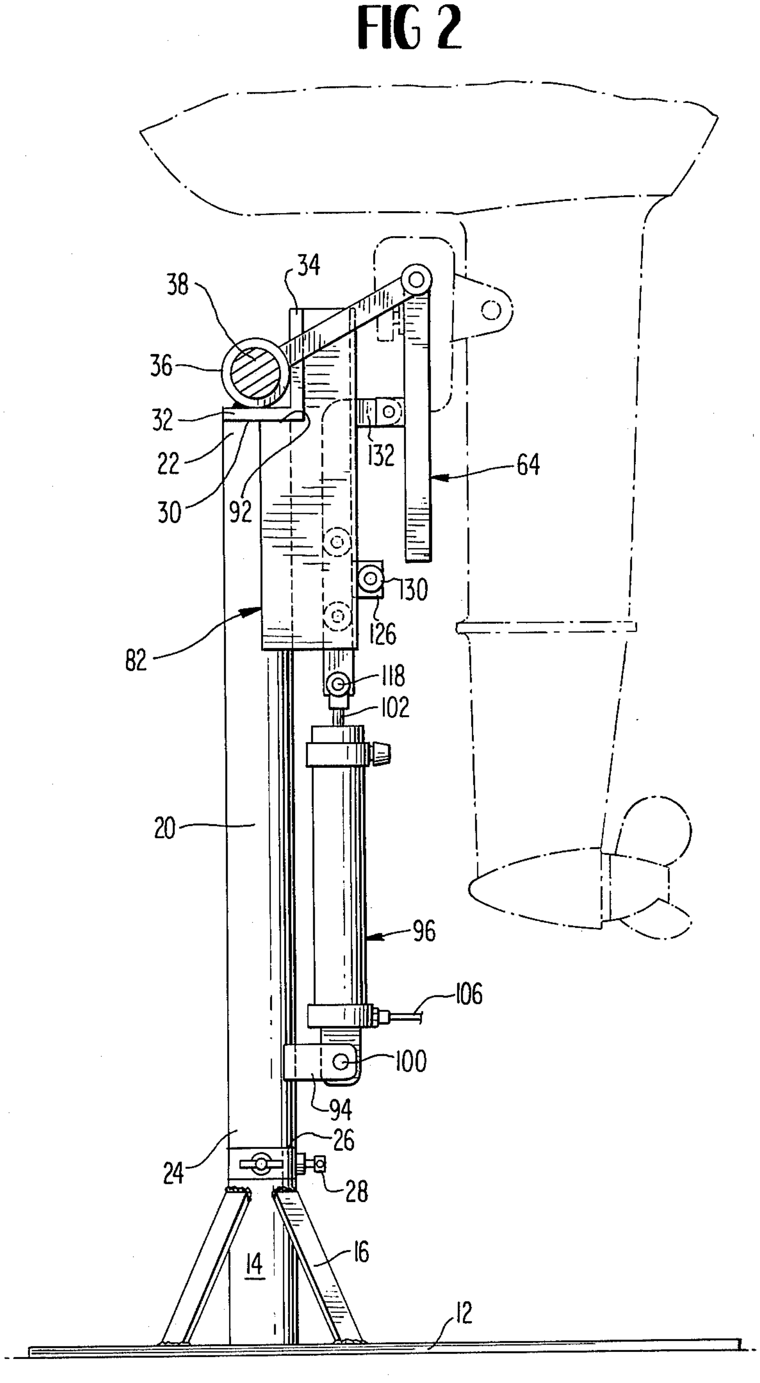
FIG. 2 is a view similar to FIG. 1 showing the mounting plate in vertical position.
Figure 3:
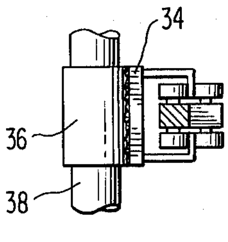
FIG. 3 is a sectional view showing details on Line 3—3 of FIG. 1 looking in the direction of the arrows.

In operation, an outboard motor or other item such as that shown in FIG. 2 is clamped on the mounting plate 64. The operator then actuates the pump to cause the ram 102 to be extended thus forcing the trolley assembly upward and with it tilting the mounting plate, this continuing until the motor is in selected position. The tube may also be rotated on the standard by loosening of the fasteners 28 and then rotating it to the desired position.

I claim:

1. An outboard motor repair stand comprising:

a base with a vertically extending standard projecting therefrom;

a carrier tube slidably engaged on the standard and means to lock the carrier tube at selected height on the standard, the carrier tube having an upper end;

a bracket on the upper end of the tube, the bracket including a horizontal foot and a vertical leg;

a sleeve fixedly secured to the bracket;

an elongated horizontal rod mounted within the sleeve, and having first and second side portions projecting laterally from the sleeve;

an outer bearing assembly on the first side portion of the rod, and an inner bearing on the second side portion thereof;

a radial, outward arm on each of said bearing assemblies;

a motor mounting plate pivotally secured between the arms, and having mounting tabs on one face thereof;

a channel track assembly fixedly secured to the carrier tube and to the bracket adjacent the upper end of the tube;

a hydraulic pump mounted on the rod;

a hydraulic cylinder, including an extensible and retractable ram vertically mounted on the tube below and in alignment with the channel track assembly; hydraulic conduit means extending between and operatively associating the pump with the hydraulic cylinder; and a trolley assembly having a lower end secured to the ram, an upper end lock section pivotally secured to said mounting tabs on said motor mounting plate, and a series of rollers engaging the channel track assembly.

2. The invention of claim 1 wherein:

the channel track assembly comprises a pair of substantially L-shaped bars each having a leg member and a foot member, the leg members being fixedly secured to the tube with the foot members in spaced apart, confronting relation;

the foot members having inner and outer surfaces; and the trolley assembly having an elongated body member and a medial lateral block, at least two of the rollers being located on the body member and contacting the inner surfaces of the foot members, and the lateral block projecting between the foot members and having at least one of said rollers thereon in contact with the outer surfaces of the foot members.

3. The invention of claim 2, wherein:

the body member of the trolley assembly includes said upper end lock section, comprising a perpendicularly arranged arm having a top edge, the edge contacting the motor mounting plate face when said ram is in fully extended position.

4. A motor repair stand comprising:

a base having a vertical standard, the standard including a carrier tube;

means securing an elongated horizontal rod on said carrier tube at its upper end;

a series of arm pivotably mounted on said rod and extending radially outwardly thereof;

a motor mounting plate pivotably secured at one end to said arms;

a vertically extending track on said carrier tube;

a trolley assembly including an elongated body mounted for vertical movement in said track, said trolley assembly elongated body terminating in a perpendicular offset portion underlying said plate and facing away from said one end of said plate, the end of said perpendicular offset portion of said elongated body being pivotably connected to the bottom of said motor mounting plate at a point spaced from said plate one end;

a hydraulic cylinder secured on the carrier tube below the track and having a vertically extensible and retractable ram secured to the trolley; and hydraulic pump means for the cylinder whereby vertical extension of the ram moves the trolley upwardly in the track to pivot the mounting plate upwardly and to a generally horizontal position, with said perpendicular offset portion of said elongated body constituting a safety lock for said motor mounting plate, and retraction of the ram pulls the trolley downwardly to pivot the plate down to vertical position adjacent the side of said vertically extending track.

* * * * *